Patented Apr. 24, 1923.

1,452,795

UNITED STATES PATENT OFFICE.

HENRY DE HOOYDONCK, OF BIARRITZ, FRANCE.

WHEEL WITH IMPROVED PNEUMATIC TIRE FOR MOTOR VEHICLES.

Application filed October 15, 1921. Serial No. 507,819.

*To all whom it may concern:*

Be it known that I, HENRY DE HOOYDONCK, subject of the King of Belgium, residing at Avenue Edouard VII, Biarritz, Basses-Pyrenees, France, have invented certain new and useful Improvements in a Wheel with Improved Pneumatic Tire for Motor Vehicles, of which the following is a specification.

The invention relates to an improved pneumatic tire wheel and the object thereof is to construct a wheel in which the outer casing tread may be of any usual commercial type, but the air chamber occupies the entire space comprised between the hub, two lateral metal flanges and the inner surface of the casing.

By means of this device it is possible to obtain, in a wheel which is as light and of a structure as economical as those used at present, a pneumatic tire of great capacity in which a large part of the chamber is in contact with the metal flanges which permit cooling and hence assure the resilient condition of the tire notwithstanding the causes which heat the internal air.

The accompanying drawing shows by way of example a form of carrying out the invention.

Figure 1:
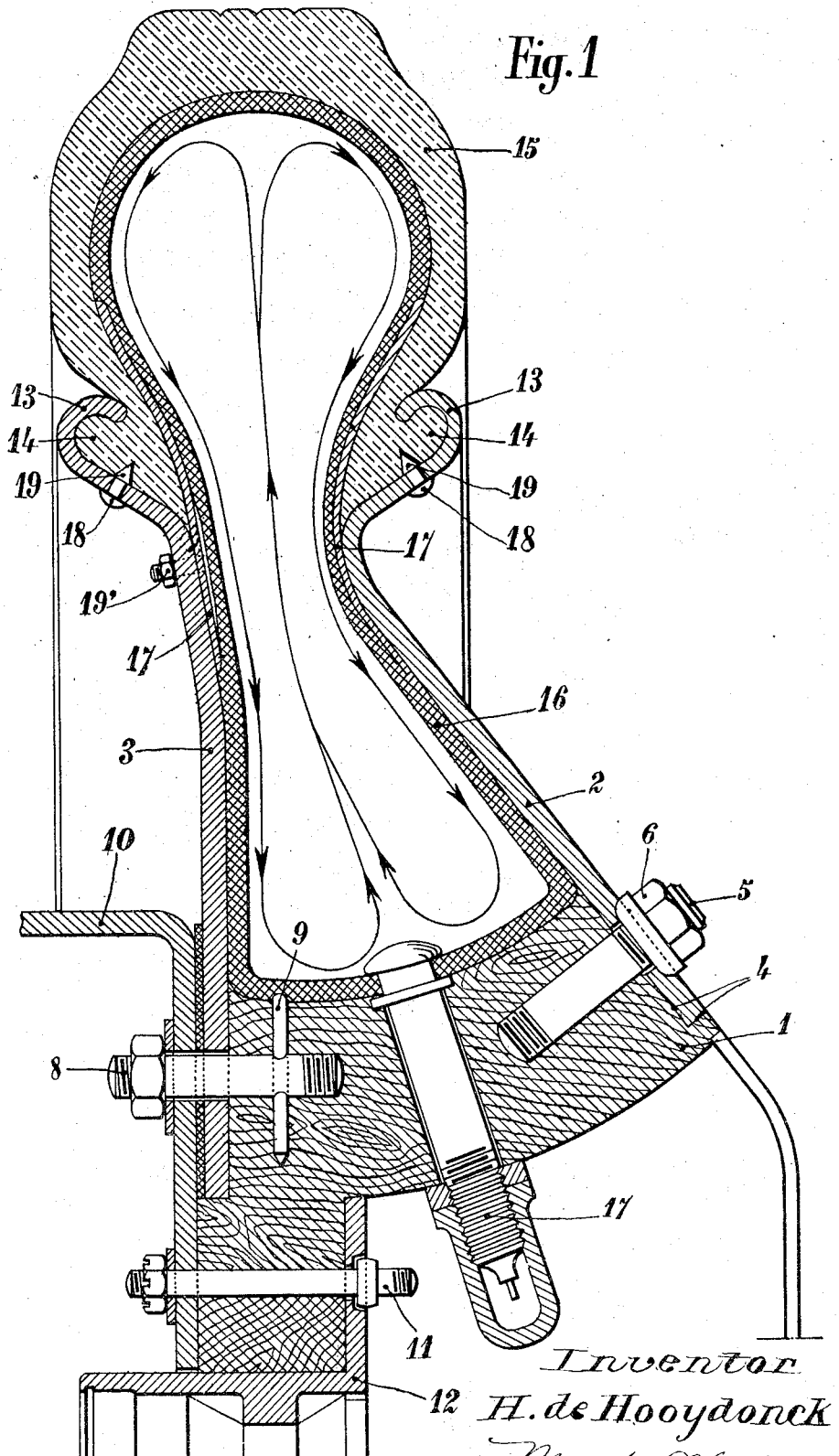
Fig. 1 is a half vertical section of an improved wheel according to this invention.

The wheel is provided with a recessed hub 1 on which are secured the two cheeks 2 and 3. The outer cheek 2 is chased in the shape of a conical cap held at its central part on a bearing 4 of the hub, through which bearing it is centered on the hub. Studs 2 uniformly distributed on one and the same conical surface receive nuts 6 the spherical base of which holds the cheek 2 on the hub. The cheek 3 is chased in the shape of a bowl with a flat bottom in its central part and is secured on a bearing 7 of the hub by means of studs 8 secured in this hub and immobilized by pins 9. These studs serving also to secure the wheel on a brake drum 10 have the same use as the bolts 11 serving at the same time to hold the axle socket 12.

The cheeks 2 and 3 are chased at their periphery so as to provide two opposite channels 13 receiving the beads 14 of the thread cover 15 of the pneumatic tire.

The air tube 16 is so constructed as to occupy the entire space comprised between the hub, the cheeks 2 and 3 and the cover 15. Inflated by means of the valve 17, it closely fits the inner walls of the cavity thus provided in the wheel.

It will be understood, without any further explanations, how large is the volume of air which can be contained in this air tube, this volume being at least triple of that capable of being received in any air tube of circular cross section such as actually used. More than half of the total surface represented by the walls of the air tube 16 is in contact with large metallic surfaces exposed to the outer atmosphere used here as cooling medium. This cooling which mainly takes place through the lateral surface of the cheeks 2 and 3 is very intense and such that it may be quickly renewed.

The air tube 16 is strengthened by strong canvas strips at the place where it narrows adjacent to the beads of the cover at 17. These strips which may be glued on the air tube or provided in the course of the manufacture of the latter prevent the said air tube from stretching in that region under the action of the internal pressure. It results therefrom that the air tube is forcibly pressed at 17 and is completely stationary relatively to the wheel.

For avoiding the rotation of the cover 15 relatively to the cheeks 2 and 3, these latter carry rivets 18 uniformly distributed on the periphery of these cheeks and the points 19 of which enter into the beads 14 which they securely hold stationary.

The replacement of an air tube is rapidly effected. It suffices to unscrew the nuts 6 for removing the cheek 2 which completely uncovers the air tube 16. For facilitating the mounting of the latter, it may be provided with bolts $19^1$ the head of which is constituted by a plate secured between the air tube and the canvas strip 17 and which are secured on the cheek 3 in holes suitably formed in the latter.

Owing to this arrangement the cheek 2 only can be removed without necessitating the taking to pieces the entire wheel. The latter can be inverted, this may present an advantage, when on the road and when it is necessary to replace the air tube of the cheek 3, the wheel being thus sustained and access may be had to the air tube to be replaced from the exterior of the car.

Figure 2:
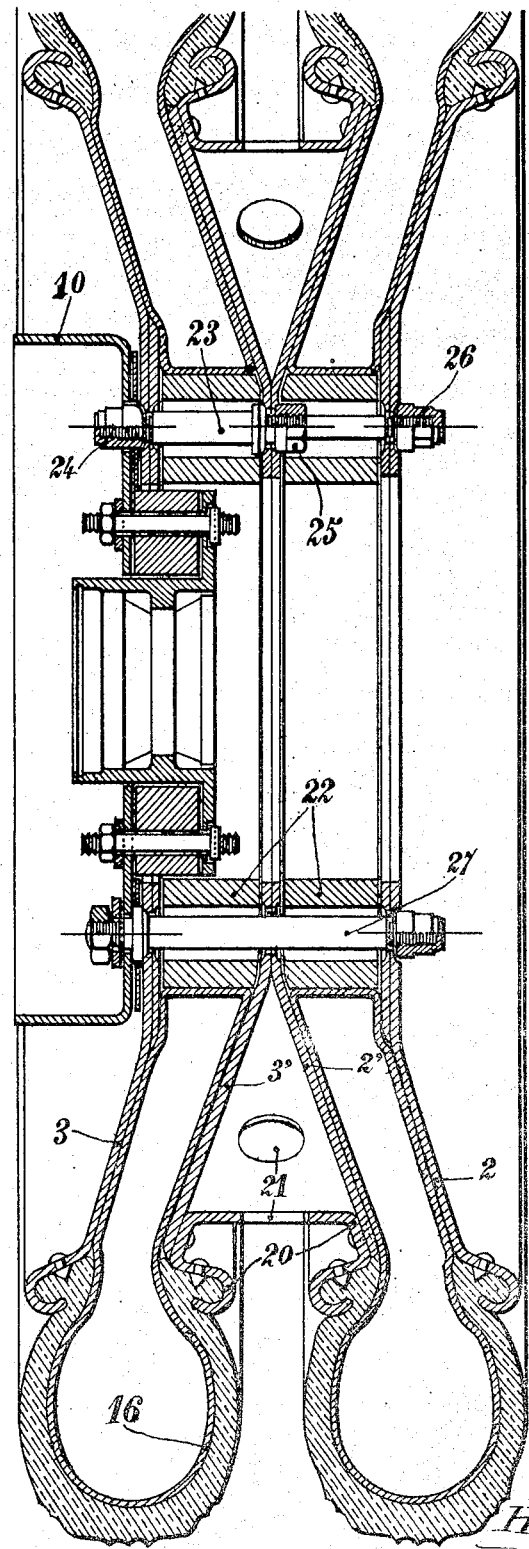
Fig. 2 is a vertical section of a twin wheel.

It is to be understood that all detail improvements already described and illustrated in Fig. 1 can be applied to the twin wheel shown in Fig. 2.

What I claim as my invention and desire to secure by Letters Patent is:

1. In a wheel with improved pneumatic tire, an air chamber having an inflation valve and occupying the entire space comprised between the internal surface of the tire casing, the metal cheeks of the wheel and the periphery of the hub of the wheel, the hub of the wheel being hollow and having its inside communicating with the inflation valve for the air chamber and the cheeks being removably connected to said hub and having stamped surfaces both extending laterally from the plane of the tread of the tire casing.

2. An improved combination wheel and pneumatic tire including a hollow hub, side cheeks removably connected thereto, a casing supported by the cheek at the peripheral edges thereof, an air tube occupying the entire space between the hub, casing and cheeks, an inflation valve mounted through the inner periphery of the hub and communicating with the tube and the outer portions of the cheeks being extended laterally from the plane of the thread of the casing, substantially as and for the purposes set forth.

3. In a wheel with improved pneumatic tire, an air tube occupying the entire space comprised between the inner face of a tread cover of usual dimensions, the metal cheeks of the wheel and the periphery of the hub of the latter, means for easily fitting up and removing the pneumatic tire and consisting in securing the cheeks on the hub by studs screwed in the latter, the hub being hollow and traversed by the valve for inflating the air tube, and means for strengthening the air tube at its narrow portion between the beads of the tread cover and for holding it when it is fitted in position.

4. In a wheel with improved pneumatic tire for motor vehicles, an air tube of large capacity held between the hub, the side metal cheeks and a tread cover with beads, strips of strong canvas strengthening the air tube at the place of its contact with the beads of the cover, bolts the head of which is in the shape of a plate clamping the air tube and one of the strengthening canvas strips serving to secure it on the rear cheek when fitting up the tire, rivets with a pointed head projecting in channels receiving the beads of the cover, immobilizing the latter in rotation relatively to the wheel.

In testimony whereof I have affixed my signature in the presence of two witnesses.

HENRY DE HOOYDONCK.

Witnesses:
J. LARTEGES,
B. MATKENS.